US008482714B1

(12) United States Patent
Seder

(10) Patent No.: US 8,482,714 B1
(45) Date of Patent: Jul. 9, 2013

(54) STROBOSCOPIC ANIMATION SYSTEM

(76) Inventor: Rufus Butler Seder, Arlington, MA (US)

( * ) Notice: Subject to any disclaimer, the term of this patent is extended or adjusted under 35 U.S.C. 154(b) by 253 days.

(21) Appl. No.: 13/015,119

(22) Filed: Jan. 27, 2011

Related U.S. Application Data

(60) Provisional application No. 61/299,033, filed on Jan. 28, 2010.

(51) Int. Cl.
*G03B 25/00* (2006.01)
(52) U.S. Cl.
USPC .................. 352/87; 40/421; 40/442; 446/243
(58) Field of Classification Search
USPC .............. 353/87, 101; 40/421, 423, 430, 433,
40/435, 442, 431; 446/243; 472/61; 352/87,
352/101, 49, 50
See application file for complete search history.

(56) References Cited

U.S. PATENT DOCUMENTS

| | | | |
|---|---|---|---|
| 1,014,365 A | | 1/1912 | Bourgin |
| 3,694,062 A | | 9/1972 | Koenig |
| 3,700,880 A | * | 10/1972 | Smith ............................ 40/433 |
| 3,951,529 A | | 4/1976 | Gandia |
| 4,085,932 A | * | 4/1978 | Hamano ......................... 472/61 |
| 4,307,528 A | * | 12/1981 | Dewees et al. .................. 40/433 |
| 5,760,874 A | | 6/1998 | Rudnick |
| 5,870,170 A | | 2/1999 | Pope |
| 6,097,468 A | | 8/2000 | Muehlenhard |
| 6,647,651 B2 | | 11/2003 | Cutright |
| 7,940,371 B2 | * | 5/2011 | Barnett et al. ................ 352/101 |
| 2008/0129963 A1 | | 6/2008 | Hohl |

OTHER PUBLICATIONS

Hasbro, Lite-Brite Spider-Man 3 Flash Art Neon Paint Spinner, www.hasbro.com website, Hasbro, Inc., Pawtucket, Rhode Island, USA.

* cited by examiner

*Primary Examiner* — William C Dowling
(74) *Attorney, Agent, or Firm* — O'Connell Law Firm; Thomas P. O'Connell

(57) ABSTRACT

A stroboscopic animation system with a handheld stroboscopic light with a light source that emits stroboscopic flashes, a manually rotatable top, and images to be animated retained on the upper surface of the top, such as on an animation disk. The frequency of the stroboscopic flashes can be varied, such as by a rotatable dial, with the "on" portions remaining constant and the "off" portions being adjusted. The flashes can have a lower limit of 10 to 20 flashes per second and an upper limit of 100 to 110 flashes per second, the "on" portions of the flashing sequence can be between one-900th and one-1100th of a second, and the luminous intensity of the light source can be between 65 and 130 foot candles. An orientation switch can automatically induce an "off" condition when the light is disposed outside a predetermined angular range of orientation.

19 Claims, 5 Drawing Sheets

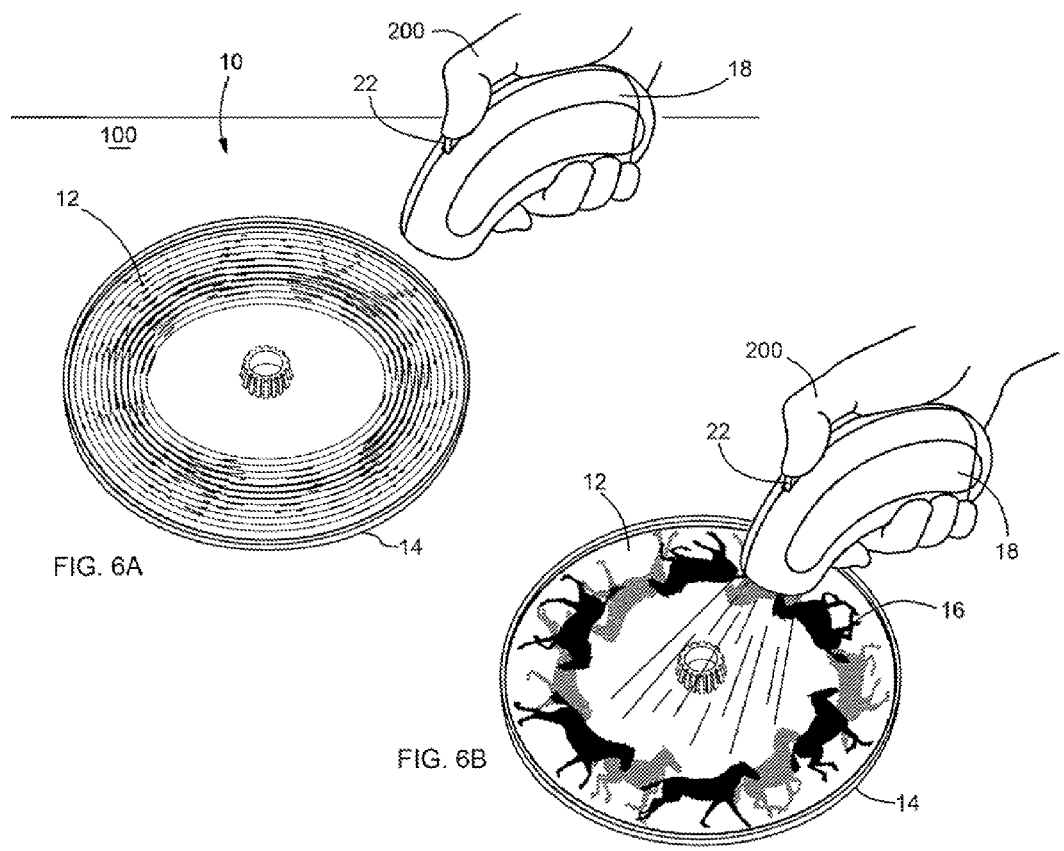
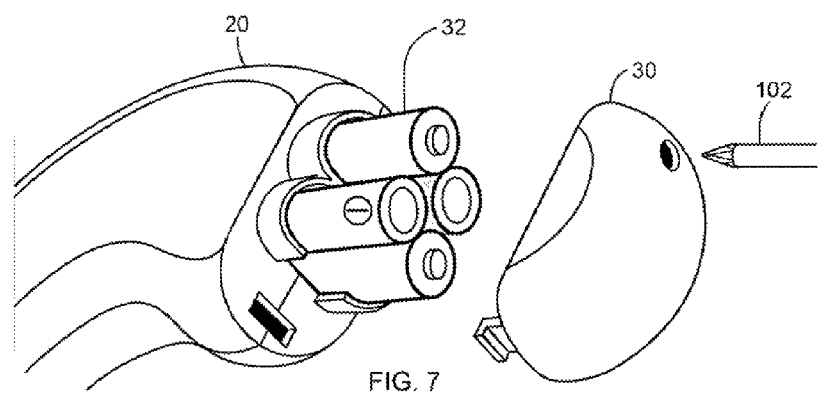

STROBOSCOPIC ANIMATION SYSTEM

FIELD OF THE INVENTION

The present invention relates generally to animation devices. More particularly, disclosed herein is a stroboscopic animation system wherein images applied to a manually rotatable top can be selectively animated by use of a handheld stroboscopic light source.

BACKGROUND OF THE INVENTION

A zoetrope produces the illusion of motion from a rapid succession of static pictures. A typical zoetrope employs a rotatable cylinder with vertical slits cut into its sides. A band including a series of images, which can be drawings or photographs, is placed within the cylinder to be viewed through the slits. The cylinder can then be rotated while the viewer looks through the slits at the images on the opposite side of the cylinder's interior.

As the viewer sees the images pass by an individual slit, the illusion of motion is perceived. This illusion of motion depends on two things: persistence of vision and the phi phenomenon. Persistence of vision derives from the length of time the retina, which basically forms a "screen" at the back of our eyes that receives light, retains an image. When a flash of light is perceived every tenth of a second or less, it is perceived as continuous. Each flash of light leaves an impression that persists in the retina for at least one-tenth of a second. Because of this persistence, the viewer cannot tell when one flash ends and the next begins thereby giving the perception of continuity. In a zoetrope, that persistence is achieved by viewing through the slots, which simulate flashes of light to the viewer in a stroboscopic effect. The other contributor to the illusion of motion, the Phi phenomenon, derives from the human instinct to create a relationship between images that are viewed in quick progression. The brain naturally seeks to merge the gaps between the progressive images to produce greater continuity of movement.

One knowledgeable in the field will be aware that persistence of vision and the Phi phenomenon have been exploited in numerous other applications. In one application, a flat disk with a cyclic series of images is placed on a record turntable, and an upstanding mirror arrangement with a number of facets corresponding to the number of images is centered on the turntable. With that, the turntable can be rotated, and the illusion of animation of the series of images is achieved as the viewer focuses on the mirror arrangement. A similar turntable arrangement is disclosed in U.S. Pat. No. 6,549,503, except that the mirror arrangement is replaced by a fixedly retained stroboscopic light and the images are perceived by a generally inactive operator through one or more "viewing ports."

While very entertaining, such arrangements require a turntable, which is becoming a less and less common possession as vinyl records become increasingly rare. Moreover, the mirror arrangement employed previously, although attractive and entertaining, would be relatively expensive and complex to reproduce and is easily damaged and prone to malfunction. Still further, since the animation may be automatically produced, the user is entertained but may not be able to vary the character of the animation and to achieve the learning that derives therefrom. Even further, it will be seen that the animation devices of the prior art have left the user as an inactive observer who watches the animation phenomenon with no ability to impart much effect on the same other than to trigger its start or to re-energize its motion.

SUMMARY OF THE INVENTION

Based on the inventor's knowledge of the state of the prior art as summarized above, the present invention was made with the basic object of providing a system that creates the illusion of animation through the persistence of vision and Phi phenomena in a hand-operated arrangement.

A more particular object of the invention is to provide a stroboscopic animation system that enables a user to control the character of animation thereby to provide education and entertainment to users.

Another object of embodiments of the invention is to provide a stroboscopic animation system that is simple in construction and can be operated without a need for a turntable or other external device.

Still another object of the invention is to provide a stroboscopic animation system that allows the user to become an active participant in producing and controlling animation during use of the system and not merely an inactive observer.

An underlying object of the invention is to create a stroboscopic animation system that will engage the user in interactive participation for extended periods of time through the ability to adjust animation effects selectively and in relation to the constantly varying physical phenomena of a diminishing rotational speed of an animation disk.

A further underlying object of the invention is to provide a stroboscopic animation system that develops motor skills, visual acuity, logic, and an understanding of the underlying scientific principles by challenging the user to adapt to changing rotational conditions to produce a desired animation effect.

These and further objects and advantages of embodiments of the invention will become obvious not only to one who reviews the present specification and drawings but also to those who have an opportunity to enjoy the use of an embodiment of the stroboscopic animation system disclosed herein. However, it will be appreciated that, although the accomplishment of each of the foregoing objects in a single embodiment of the invention may be possible and indeed preferred, not all embodiments will seek or need to accomplish each and every potential object and advantage. Nonetheless, all such embodiments should be considered within the scope of the present invention.

In carrying forth the foregoing objects, a basic embodiment of the stroboscopic animation system disclosed herein comprises a handheld stroboscopic light with a light source and means for actuating the light source to emit stroboscopic flashes with a stroboscopic frequency and a manually rotatable top with an upper surface and a lower surface. Means are provided for retaining images to be animated on the upper surface of the top, whether by printing directly on the upper surface of the top or by the application of animation disks to the top. Under this arrangement, images retained on the upper surface of the top can be animated by a rotation of the top and a stroboscopic illumination of the images by the light source of the stroboscopic light.

Means, such as a rotatable control dial, a slide switch, or any other effective mechanism, can be provided for adjusting the stroboscopic frequency of the flashes emitted by the light source. Where a dial is employed, the means for adjusting the stroboscopic frequency can adjust the stroboscopic frequency of the light source from a lowest frequency at a first end of rotation of the control dial and a highest frequency at a second end of rotation of the control dial. In certain embodiments, the first and second ends of rotation of the control dial can be reached within approximately one revolution of the control dial or less. For providing clear animation at the upper and lower limits, the lower frequency limit can be approximately 10 to 20 flashes per second and the upper frequency limit can be approximately 100 to 110 flashes per second.

The flashes emitted by the light source have a flashing sequence formed by a series of "on" portions separated by a series of "off" portions. To ensure a desired luminous intensity, the means for adjusting the stroboscopic frequency of the flashes emitted by the light source can maintain a fixed duration of the "on" portion of the flashing sequence while varying the duration of the "off" portion of the flashing sequence to vary the stroboscopic frequency of the flashes emitted by the light source. As taught herein, embodiments of the light source can have a fixed duration of the "on" portion of the flashing sequence between one-900th and one-1100th of a second. Moreover, the light source can achieve effective animation even in relatively bright ambient conditions by having a luminous intensity of between approximately 65 and 130 foot candles.

The safety and convenience of the stroboscopic light can be improved even further by having an orientation switch electrically connected to the stroboscopic light source that permits an "on" condition of the stroboscopic light source when the stroboscopic light is disposed within a predetermined angular range of orientation and that automatically induces an "off" condition of the stroboscopic light source when the stroboscopic light is disposed outside the predetermined angular range of orientation. For example, the predetermined angular range of orientation can be disposed below horizontal, such as by including vertically downward and a range of orientation from vertically downward in at least one direction.

One will appreciate that the foregoing discussion broadly outlines the more important goals and features of the invention to enable a better understanding of the detailed description that follows and to instill a better appreciation of the inventor's contribution to the art. Before any particular embodiment or aspect thereof is explained in detail, it must be made clear that the following details of construction and illustrations of inventive concepts are mere examples of the many possible manifestations of the invention.

BRIEF DESCRIPTION OF THE DRAWINGS

In the accompanying drawings:

FIGS. 6A and 6B are first and second perspective views of the stroboscopic animation system during an adjustment of the frequency of the handheld stroboscopic light to establish persistence of vision;

FIG. 7 is a perspective view of the handheld stroboscopic light with the battery cover removed;

DETAILED DESCRIPTION OF PREFERRED EMBODIMENTS

The invention for a stroboscopic animation system disclosed herein is subject to widely varied embodiments. However, to ensure that one skilled in the art will be able to understand and, in appropriate cases, practice the present invention, certain preferred embodiments of the broader invention revealed herein are described below and shown in the accompanying drawing figures.

Figure 1:
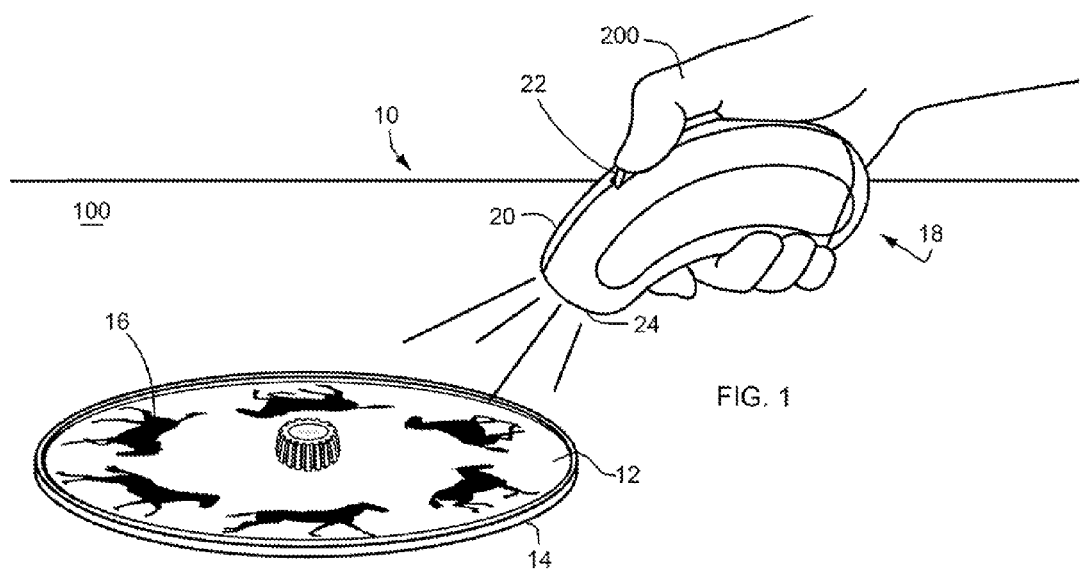
FIG. 1 is a perspective view of a stroboscopic animation system pursuant to the invention.
Figure 2:
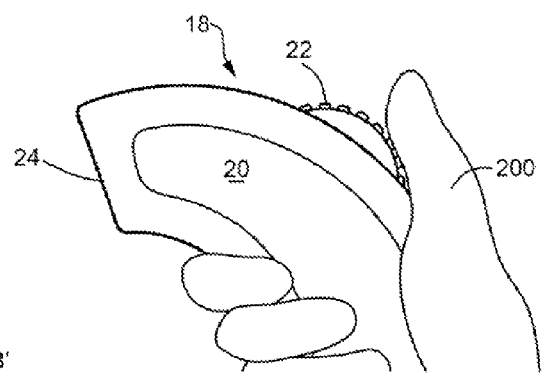
FIG. 2 is a view in side elevation of a handheld stroboscopic light as disclosed herein.

A stroboscopic animation system pursuant to the present invention is indicated generally at 10 in FIG. 1. The stroboscopic animation system 10 is formed by a handheld stroboscopic light 18 in combination with a manually rotatable top 14 that retains an animation disk 12. The animation disk in FIG. 1 has a cyclic series of images 16 disposed thereon. In this example, the images 16 comprise images of a galloping horse and are disposed with an orientation generally perpendicular to the respective radii of the animation disk 12. As described further hereinbelow, the stroboscopic light 18 has a pistol-handle shaped body portion 20 that retains a stroboscopic light source 24 that can be selectively aimed by a user. The light source 24 can be adjusted in frequency by operation of a frequency adjustment mechanism 22, which in this case comprises a control dial 22. Of course, numerous other adjustment mechanisms could be employed within the scope of the invention, including a slide switch, a lever, or some other means.

Figure 4A:
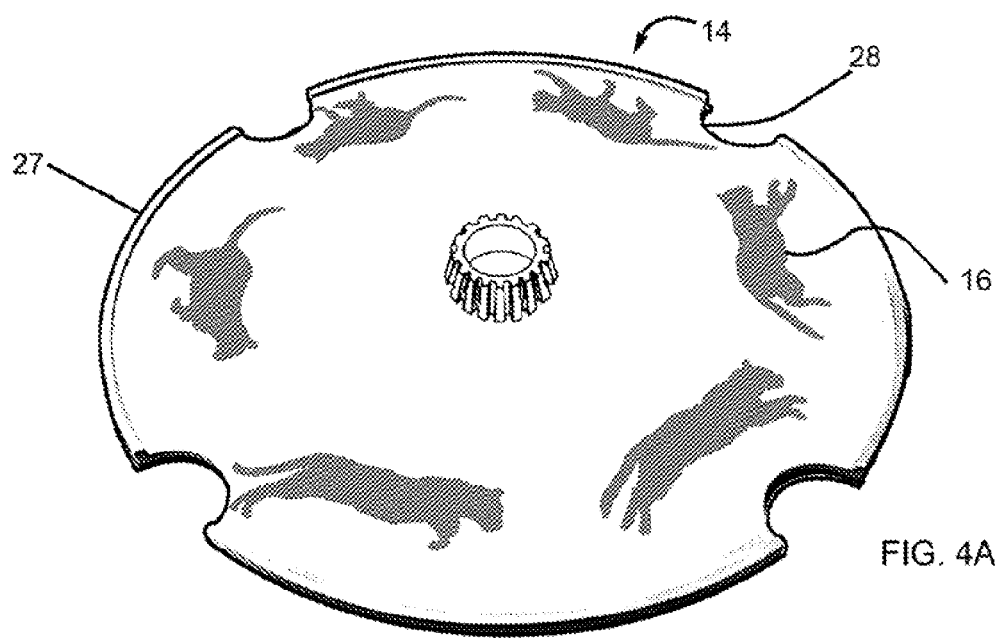
FIG. 4A is a perspective view of a stroboscopic top pursuant to the present invention.
Figure 4B:
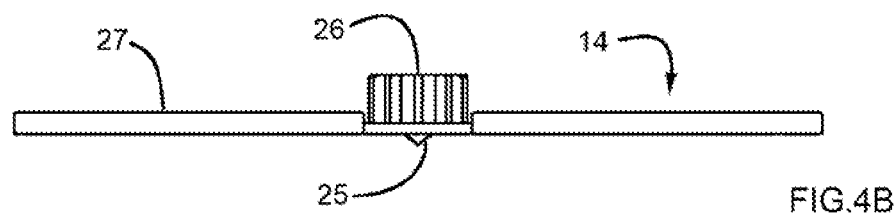
FIG. 4B is a view in side elevation of the stroboscopic top of FIG. 4A.
Figure 5:
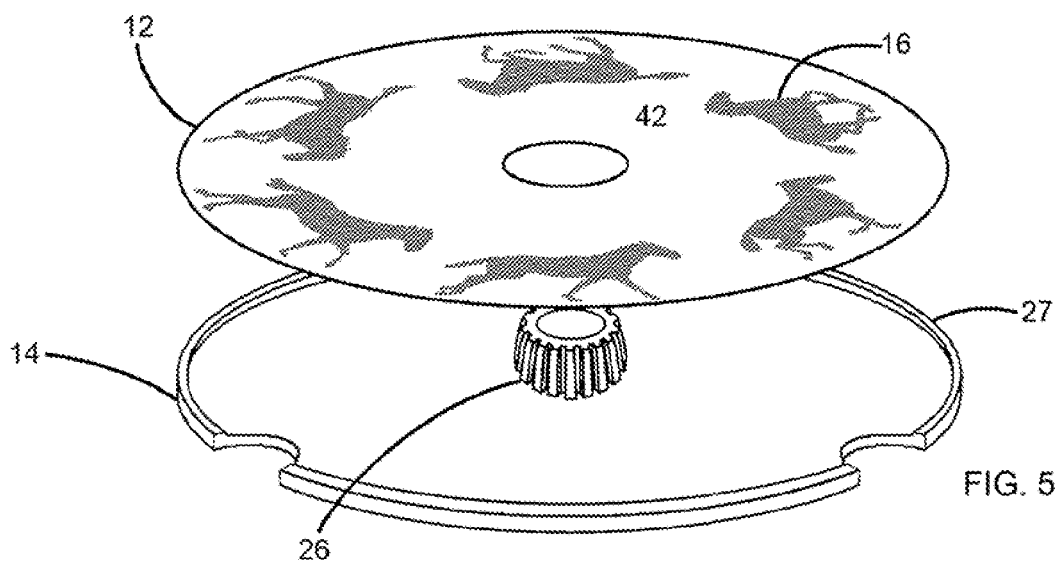
FIG. 5 is a perspective view of an animation disk in the process of being applied to the stroboscopic top.

As shown in FIG. 4A, the top 14 can have a flat body portion with a concentric, upstanding hub 26 that can be used to permit a manual rotation of the top 14 and to enable a secure retention of an animation disk 12, which can have a centered annular aperture 42 for receiving the hub 26. As seen in the elevational view of FIG. 4B, the top 14 can additionally have a concentric protuberance 25 projecting from its bottom side to permit low friction spinning of the top 14. As shown in this embodiment, the top 14 in certain embodiments can have a series of images 16 printed directly thereon to permit animation with or without a separate animation disk 12 in place relative to the top 14. The top 14 can additionally include a plurality of peripheral finger notches 28 to render removing and replacing animation disks 12 more convenient and, potentially, to provide another means for inducing the top 14 to rotate. As best seen in FIG. 5, embodiments of the top 14 can have a peripheral ridge 27 that can further assist in retaining an animation disk 12 in a proper, concentric orientation.

Under this arrangement, animation with the stroboscopic animation system 10 can begin with inducing the animation disk 12 to rotate on a support surface 100, such as by a twisting of the hub 26 or by the application of tangential force to one or more of the peripheral finger notches 28. The light source 24 of the stroboscopic light 18 can then be aimed at the animation disk 12, potentially at a particular location on the disk 12, under the control of a user's hand 200. It has been found that spacing the stroboscopic light 18 between roughly three (3) and six (6) inches from the surface of the animation disk 12 is preferred for effective animation of a localized portion of the disk 12.

With the stroboscopic light 18 suitably positioned as in FIGS. 6A and 6B, the adjustment mechanism 22 can be employed to adjust the frequency of the stroboscopic flashes emitted by the stroboscopic light 18. The frequency can be adjusted as necessary until the appropriate frequency is reached to convert the image perceived by the observer from the blurry image depicted in FIG. 6A to the clear animation image, in this case a galloping horse 16, depicted in FIG. 6B. Furthermore, by a fine adjustment of the stroboscopic frequency by use of the adjustment mechanism 22, the images 16 on the stroboscopic disk 12 can be caused to animate in place, to advance at a given speed, or to retreat at a given speed in relation to the circumference of the disk 12. In the present example, the horse 16 can thus be caused to appear to gallop in place, to trot around the disk 12, or to lose ground.

Figure 8:
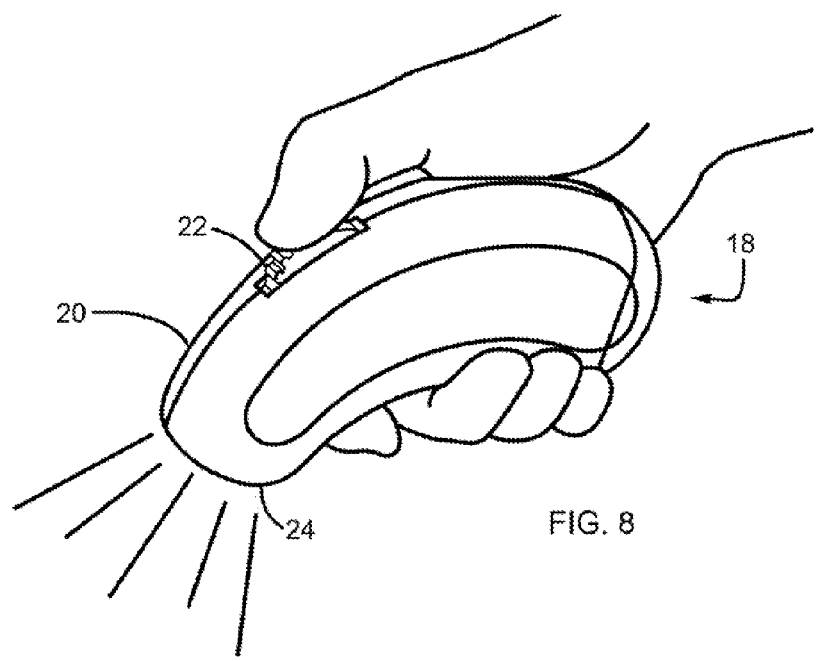
FIG. 8 is a perspective view of the handheld stroboscopic light depicting adjustment of the frequency dial.

Under currently preferred embodiments of the invention employing a control dial 22 as the adjustment mechanism, it has been found to be preferable to enable an adjustment of the frequency of the flashing of the light source 24 from its low frequency to its high frequency with a single revolution as opposed to multiple revolutions. The highest desirable flash rate is achieved at one end of the rotation of the dial 22, and the lowest desirable flash rate is achieved at the opposite end of the rotation of the dial 22. Adjustment of the flash rate can thus be adjusted as suggested in FIG. 8.

The structure and operation of the stroboscopic light 18 could vary within the scope of the invention except as it might be expressly limited by the claims. With combined reference to FIGS. 8 and 9, one embodiment of the stroboscopic light 18 can be seen to be powered by a plurality of batteries 32 that are retained by a battery sleeve and battery cover combination 30. The battery cover 30 can be selectively retained by a snap-fit arrangement or, additionally or alternatively, by one or more mechanical fasteners operated by a screwdriver 102 or other means.

Illumination and flash rate frequency of the light 18 can be controlled by the dial 22 in combination with a rotary switch 38 and one or more circuit boards 34 and appropriate wired or wireless connections. The dial 22 and the rotary switch 38 can thus provide intermittent power to the light source 24 to cause its illumination at a selected frequency. The light source 24 could be formed with a single light emitting structure or multiple light emitting structures. For example, the light source 24 could be formed by one or more incandescent bulbs. In this depicted embodiment, the light source 24 is formed by a plurality of LED lights electrically connected to illuminate in unison.

It has been found desirable to enable fine adjustment of the flash rate achieved by the light source 24 so that a user can interactively achieve desired animation effects as the disk 12 rotates and, inevitably, progressively decreases in rotational speed after being spun manually. To accomplish these goals, the inventor created a dial 22 as large as practically possible relative to the pistol grip shaped handle 18 thereby to cause points on the circumferential surface of the dial 22 to travel a greater distance per alteration in flash rate. As a result, a user has greater fine control over the adjustment of the frequency of the stroboscopic flashing.

As discussed above, it has been found desirable to enable the upper and lower limits of the frequency range achievable by the light 18 to be achieved by not more than approximately a single rotation of the dial 22. Furthermore, it is preferred to have the lower limit of the frequency range approximate the lowest flash rate likely to be necessary to produce good visual results during animation and the upper limit of the frequency range approximate the highest flash rate likely to be necessary to produce good visual results during animation. Through research and experimentation, the inventor found that the lower limit of the flash rate can be fixed at a given frequency, such as between 12 and 18 flashes per second under currently preferred embodiments, and the upper limit of the flash rate can be fixed at a given frequency, such as at approximately 110 flashes per second.

The advantages of the preferred flash rate frequency range can be better understood by reference to the actual animation sequences contemplated under the invention. For example, an animation disk 12 with a six-phase animation 16 as in FIG. 5 has been found to animate in a most lifelike manner when the top 14 is rotating at a rate of two to three times per second. With that number of animations 16 and at that rotational speed, a preferred flash rate will be as slow as 12 to 18 flashes per second. In other embodiments, there may be 18 phases of animation 16, which can be animated effectively with the disk 12 spinning at approximately six revolutions per second thereby being best animated at a frequency of 108 stroboscopic flashes per second.

The "on" and "off" pattern of the flashing sequence has also been found to be important to effective animation. It has been found to be preferable for optimal animation for the duration of the actual flash of light, the "on" portion of the flashing sequence, to remain constant while the duration of the "off" portion of the flashing sequence is shortened or elongated depending on the adjustment of the adjustment dial 22. This produces the desired luminance while permitting frequency adjustment.

During development of the invention, the flash duration was attempted to be fixed at one-1,000th of a second. However, it was discovered that the tolerances inherent in the electronic components of the stroboscopic light 18 produced variations in flash duration between lights 18. For example, stroboscopic lights 18 were produced with flash durations of one-650th of a second while others had flash durations of one-800th of a second. Each produced unacceptably blurry images. Therefore, producing a light source 24 with a reliable flash duration is highly desirable.

With seven LED light sources 24, it was found that a one-900th of a second flash duration is the longest acceptable time to achieve desired image clarity upon an initial spinning of the top 14, subject, of course, to the many other factors affecting animation quality including the number of images, image size, image detail, initial rotational speed of the top 14, and other factors particular to each animation combination. It was further determined that a flash rate shorter than one-1,100th of a second, although rendering a very sharp animated image, did not provide sufficient luminance and tended to produce an undesirably dark image. Therefore, the preferred stroboscopic light 18 with six to eight LED light sources 24 will produce flashes of light with a duration between one-900th and one-1100th of a second.

Nonetheless, since the luminous intensity provided by the LED light sources 24 will depend on their number, it should be noted that a shorter flash duration could be effective in providing sufficient luminance if additional LED light sources 24 of equal or greater luminous intensity were included beyond the seven used in one presently contemplated embodiment. For example, if twice as many LED light sources 24 of the same luminous intensity were used, a shorter flash duration might nonetheless provide sufficient illuminance, such as a shorter flash duration of one $2,000^{th}$ of a second, to deliver clear, sufficiently illuminated animation even when the top 14 is manually rotated at a high speed of angular rotation. However, additional LED light sources 24 add cost and increase energy consumption, which must be considered in manufacture and production.

The luminous intensity of the stroboscopic flashes output by the light source 24 should be sufficient to impart the fleeting visual impressions of the images to be animated on the retina but should not be so excessive as to risk eye injury or to waste resources. To cause the images illuminated by the stroboscopic flashes to be retained on the retina, there must be a sufficient disparity between the ambient light and the luminous intensity of the flashes. Where stroboscopic animation is attempted in a dark environment, such as in a darkened room or under a table by a child, a relatively weak luminous intensity will be sufficient. However, in normal practical use, such as in an illuminated toy store or a family kitchen, the luminous intensity of the light source 24 must be sufficient to outcompete the effect of the ambient light for imparting an image on the retina. The inventor was thus presented with the challenge to ascertain a range of luminous intensity bright enough to impart an image in normal ambient light without being excessively bright.

A preferred range of luminous intensity was in fact determined for the stroboscopic animation system 10. The preferred range was established with the knowledge and assumption that most participants will hold the light source 24 of the stroboscopic light 18 between approximately three and six inches from the surface of the disk 12. Illumination measurements were taken using an exposure meter sold under the registered trademark LUNA-PRO by GOSSEN GMBH of Erlangen, Germany. In a room with relatively bright ambient light measured to be in the range of approximately 16 to 32 foot candles and with stroboscopic frequency brought to a maximum by the control dial 22 such that the light source 24 of the stroboscopic light 18 has a frequency of 100 or more flashes per second, the desired range of illuminance on the surface of the disk 12 was found to be from approximately 65 to 130 foot candles within a pool of light established when the light source 24 is held three to six inches away from the sensor of the exposure meter thereby to establish a pool of light of roughly two to three inches in diameter. From this, one can further determine mathematically based on the inventor's developments that the light source 24 should be capable of emitting light at a luminous intensity of at least approximately twice that of the ambient light for effective animation.

As indicated previously, one present embodiment of the stroboscopic light 18 has a light source 24 formed by seven identical LED's that are simultaneously activated to give a luminous intensity in the desired range. It would alternatively be possible to produce a similar range of luminous intensity with some other grouping of LED's whether a greater number of LED's with a lower luminous intensity per LED, a lower number of LED's with a greater luminous intensity, or some mixture of LED's having differing intensities. In any case, the preferred LED's emit substantially white light through a water clear lens with a 15-degree viewing angle.

Figure 3:
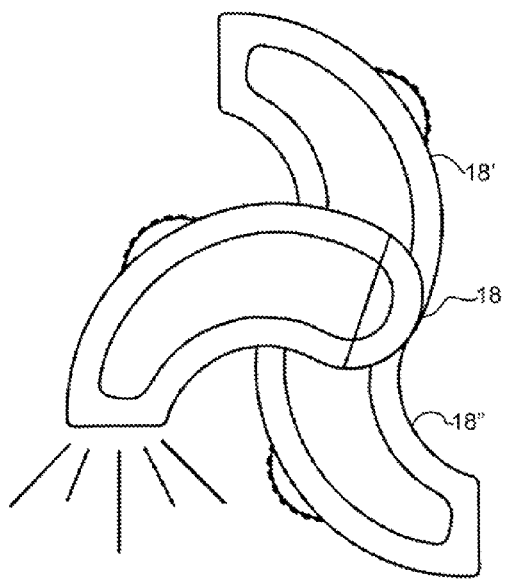
FIG. 3 provides views in side elevation of the handheld stroboscopic light in first, second, and third switching orientations.
Figure 9:
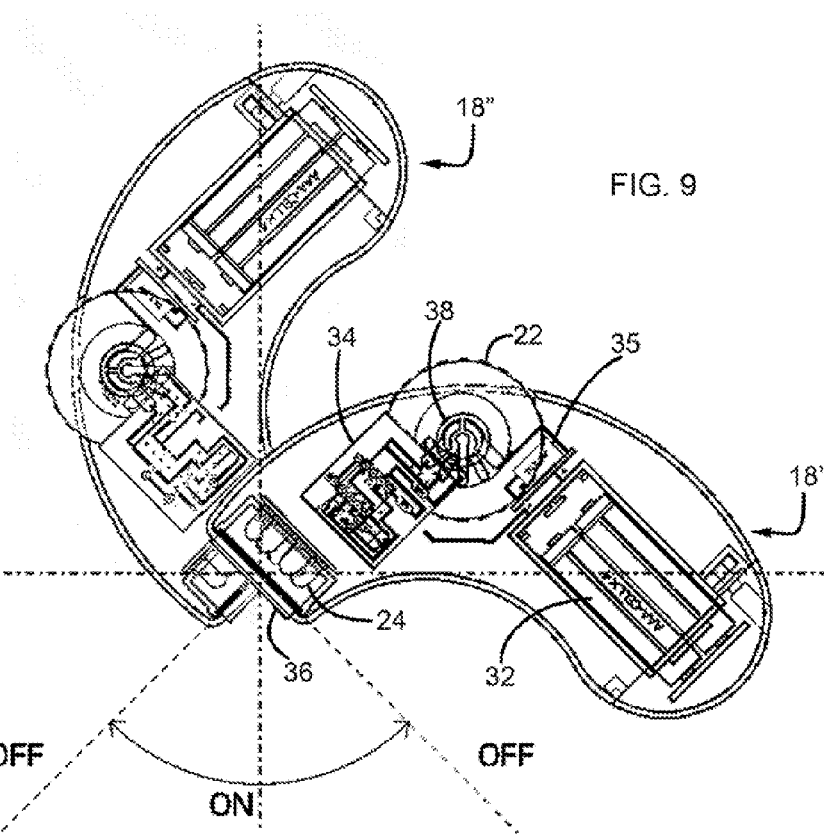
FIG. 9 is a partially disassembled view in side elevation of the handheld stroboscopic light in first and second switching orientations.

As can be understood by reference to FIGS. 3 and 9, embodiments of the stroboscopic light 18 are contemplated where the light source 24 exploits an orientation switch 35 to cause it to be automatically actuated between a stroboscopic flashing mode and an inoperable mode by a selective orientation of the light 18. More particularly, the light 18 can be oriented as indicated at 18 with the light source 24 pointed downwardly below horizontal within a predetermined angular range of vertically downward to be automatically induced to an "on" condition to produce stroboscopic flashes. The light source 24 can thereby produce animation when properly aimed and adjusted relative to a spinning top 14 and animation disk 12. However, when the light source 24 is pointed other than within the desired range of orientation, such as in the raised position indicated at 18' or the overly-lowered position indicated at 18", the stroboscopic light 18 can automatically be switched to an "off" condition by the orientation switch 35.

By automatically switching the light 18 between "on" and "off" conditions, the orientation switch 35 provides convenience and efficiency. At least as importantly, it will be appreciated that automatically switching the stroboscopic light 18 to an "off" condition when the light source 24 is pointed in an orientation outside of the "on" range or orientation controlled by the orientation switch 35 contributes to the safety and comfort of the participant and any observers by preventing light from being flashed directly into a normally-positioned person's eyes. With that, any risk of discomfort and other adverse repercussions of flashing light in a person's eyes are minimized.

Figure 10:
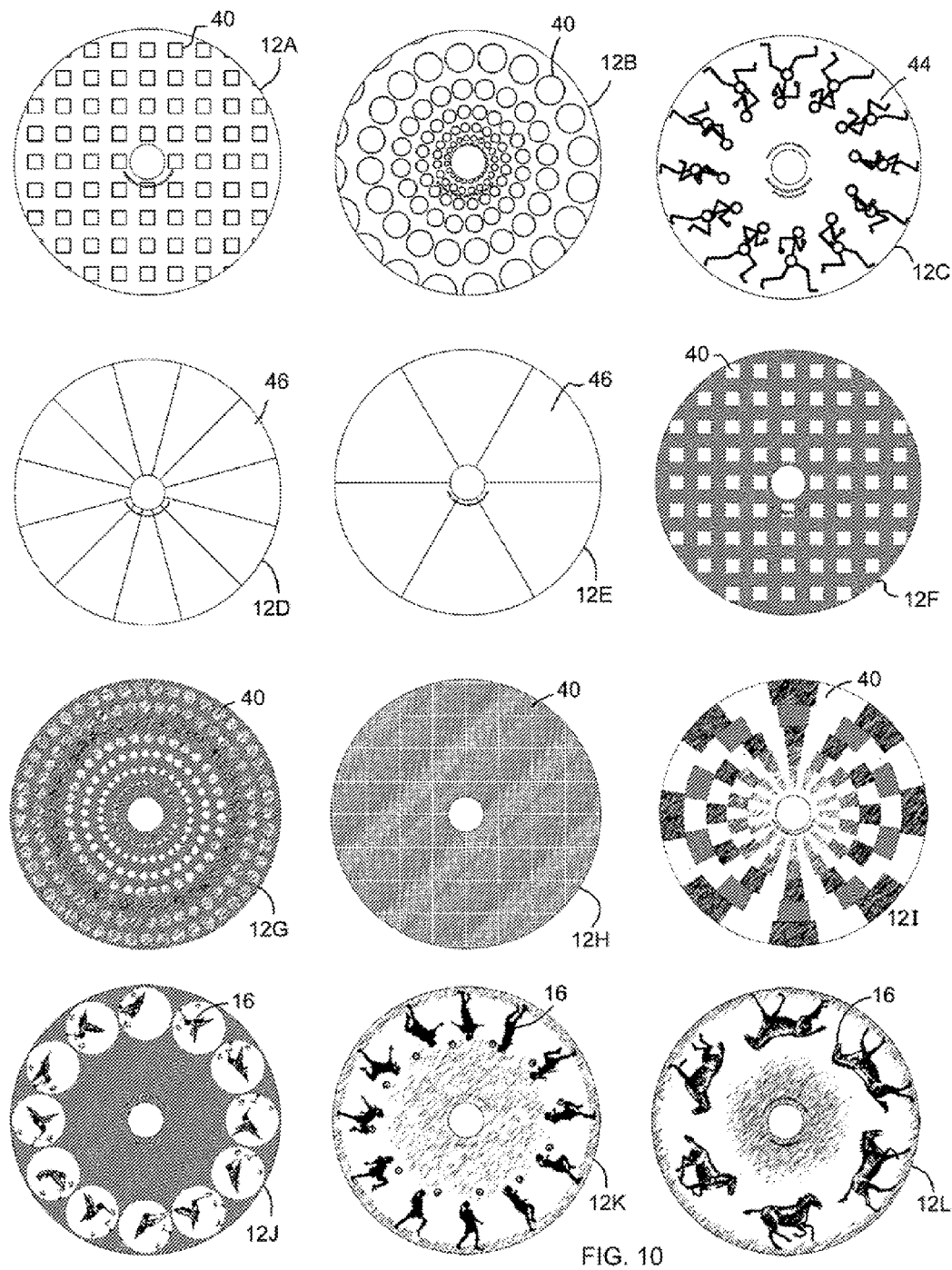
FIG. 10 provides top plan views of a plurality of different animation disks according to the present invention.

As can be appreciated by reference to FIG. 10, the type of animation provided by the stroboscopic animation system 10 can vary infinitely within the scope of the invention. For example, a cyclic series of animations 16 can be provided as in the animation disks 12J, 12K, and 12L. In other embodiments, as in relation to animation disks 12A, 12B, 12F, 12G, 12H, and 12I, various geometric shapes and patterns and designs 40 can be applied to produce varied animation effects, including kaleidoscope, moiré, and other perceived animations. In some cases, the designs can be provided entirely or in part to be drawn on by the user as in a coloring book.

In still other embodiments, basic, changing images, such as stick figure 44 appearing to move progressively, can be applied to be further animated by the user as in the animation disk 12C. For example, a user can draw on top of the stick figure 44 with crayons, markers, or any other instrument to flesh out, supplement, and ultimately create the user's own version of a running man, a galloping horse, or any other image. By providing a drawing template, the invention permits a user to impart his or her own personality and character by drawing on top of the stick figure 44 or other framework design. Since the images are founded on predetermined stick figure 44 or other predetermined frameworks, the resulting images animate beautifully and fluidically while properly being considered the user's own artwork. Even further embodiments are contemplated as shown in relation to the disks 12D and 12E where the disks 12D and 12E are divided into a plurality of animation portion slices 46 to be completed entirely by the user.

In view of the foregoing, one will appreciate that the stroboscopic animation system 10 disclosed herein allows a user to create and control the scientific phenomena involved in stroboscopic animation with the user becoming an active participant and not merely an inactive observer as is common in the prior art. With the illusion of animation being created through persistence of vision and the Phi phenomena in a hand-operated arrangement, the participant can adjust animation effects by a selective adjustment of the stroboscopic frequency, and the participant will find it necessary or at least desirable to adjust the stroboscopic frequency as the stroboscopic top 14 inevitably slows. For example, keeping a horse galloping in place while the stroboscopic top 14 slows will require the participant to adjust the adjustment dial 22 progressively seeking to match the stroboscopic flash rate to the slowing angular speed of the images to be animated. With that, the participant will rely on and develop his or her motor skills, visual acuity, scientific understanding, and logical reasoning. Still further, in certain practices of the invention, participants can partially or entirely create their own images to be animated. The stroboscopic animation system 10 thus challenges and engages the participant in an immediate and ongoing manner thereby providing education and entertainment for extended periods of time.

The animation system 10 presents a unique combination of a variably-adjustable electronic device, namely the stroboscopic light 18, and a hand-powered movable mechanical device undergoing progressively changing movement, namely the stroboscopic top 14 undergoing slowing rotational speed, to enable the creation of the illusion of animation of fixed images. The physics involved and the ever-changing need for adjustment and control by the participant challenge the participant and increase the play and educational values of the stroboscopic system 10. This is in marked deviation to the animation systems common to the prior art, whether motorized or not, where movement, illumination, and animation are under limited or no control by the user, who is thus reduced to an observer.

With certain details of the present invention for a stroboscopic animation system 10 disclosed, it will be appreciated by one skilled in the art that changes and additions could be made thereto without deviating from the spirit or scope of the invention. This is particularly true when one bears in mind that the presently preferred embodiments merely exemplify the broader invention revealed herein. Accordingly, it will be clear that those with certain major features of the invention in mind could craft embodiments that incorporate those major features while not incorporating all of the features included in the preferred embodiments.

Therefore, the following claims are intended to define the scope of protection to be afforded to the inventor. Those claims shall be deemed to include equivalent constructions insofar as they do not depart from the spirit and scope of the invention. It must be further noted that a plurality of the following claims may express certain elements as means for performing a specific function, at times without the recital of structure or material. As the law demands, these claims shall be construed to cover not only the corresponding structure and material expressly described in this specification but also all equivalents thereof that might be now known or hereafter discovered.

I claim as deserving the protection of Letters Patent:

1. A stroboscopic animation system comprising:
a handheld stroboscopic light with a light source, means for actuating the light source to emit stroboscopic flashes with a stroboscopic frequency, and means for adjusting the stroboscopic frequency of the flashes emitted by the light source;
a manually rotatable top with an upper surface, a lower surface, and a protuberance that projects concentrically from the bottom surface of the rotatable top for facilitating a spinning of the top; and
means for retaining images to be animated on the upper surface of the top;
whereby images retained on the upper surface of the top can be animated by a manual rotation of the top to cause the top to rotate upon the protuberance at an angular speed and a stroboscopic illumination of the images by the light source of the stroboscopic light and whereby the stroboscopic frequency of the handheld stroboscopic light must be progressively adjusted to achieve stroboscopic animation in response to a progressively slowing angular speed of the manually rotatable top.

2. The stroboscopic animation system of claim 1 wherein the means for adjusting the stroboscopic frequency comprises a rotatable control dial.

3. The stroboscopic animation system of claim 2 wherein the means for adjusting the stroboscopic frequency adjusts the stroboscopic frequency of the light source from a lowest frequency at a first end of rotation of the control dial and a highest frequency at a second end of rotation of the control dial.

4. The stroboscopic animation system of claim 3 wherein the first and second ends of rotation of the control dial are reached within approximately one revolution of the control dial or less.

5. The stroboscopic animation system of claim 1 wherein the means for adjusting the stroboscopic frequency of the flashes emitted by the light source establishes a lower frequency limit of approximately 10 to 20 flashes per second and an upper frequency limit of approximately 100 to 110 flashes per second.

6. The stroboscopic animation system of claim 1 wherein the flashes emitted by the light source have a flashing sequence formed by a series of "on" portions separated by a series of "off" portions and wherein the means for adjusting the stroboscopic frequency of the flashes emitted by the light source maintains a fixed duration of the "on" portion of the flashing sequence and varies a duration of the "off" portion of the flashing sequence to vary the stroboscopic frequency of the flashes emitted by the light source.

7. The stroboscopic animation system of claim 6 wherein the fixed duration of the "on" portion of the flashing sequence is between one-900th and one-1100th of a second.

8. The stroboscopic animation system of claim 1 wherein the light source has a luminous intensity of between approximately 65 and 130 foot candles.

9. A stroboscopic animation system comprising:
a handheld stroboscopic light with a light source and means for actuating the light source to emit stroboscopic flashes with a stroboscopic frequency;
a manually rotatable top with an upper surface and a lower surface;
means for retaining images to be animated on the upper surface of the top; and
an orientation switch electrically connected to the stroboscopic light source that permits an "on" condition of the stroboscopic light source when the stroboscopic light is disposed within a predetermined angular range of orientation and automatically induces an "off" condition of the stroboscopic light source when the stroboscopic light is disposed outside the predetermined angular range of orientationn;
whereby images retained on the upper surface of the top can be animated by a rotation of the top and a stroboscopic illumination of the images by the light source of the stroboscopic light.

10. The stroboscopic animation system of claim 9 wherein the predetermined angular range of orientation is disposed below horizontal.

11. The stroboscopic animation system of claim 10 wherein the predetermined angular range of orientation comprises vertically downward and a range of orientation from vertically downward in at least one direction.

12. The stroboscopic animation system of claim 1 wherein the means for retaining images to be animated on the upper surface of the top comprises an animation disk for being disposed on top of the top.

13. The stroboscopic animation system of claim 12 wherein the animation disk has portions to be completed by a user wherein the portions to be completed by the user comprise a plurality of blank animation portion slices disposed on the animation disk.

14. A stroboscopic animation system comprising a handheld stroboscopic light comprising a light source, means for actuating the light source to emit stroboscopic flashes with a stroboscopic frequency, means for adjusting the stroboscopic frequency of the flashes emitted by the light source, an orientation switch electrically connected to the stroboscopic light source that permits an "on" condition of the stroboscopic light source when the stroboscopic light is disposed within a predetermined angular range of orientation and automatically induces an "off" condition of the stroboscopic light source when the stroboscopic light is disposed outside the predetermined angular range of orientation, wherein the flashes emitted by the light source have a flashing sequence formed by a series of "on" portions separated by a series of "off" portions and wherein the means for adjusting the stroboscopic frequency of the flashes emitted by the light source maintains a fixed duration of the "on" portion of the flashing sequence and varies a duration of the "off" portion of the flashing sequence to vary the stroboscopic frequency of the flashes emitted by the light source.

15. The stroboscopic animation system of claim 14 wherein the means for adjusting the stroboscopic frequency of the flashes emitted by the light source establishes a lower frequency limit of approximately 10 to 20 flashes per second and an upper frequency limit of approximately 100 to 110 flashes per second.

16. The stroboscopic animation system of claim 14 wherein the fixed duration of the "on" portion of the flashing sequence is between one-900th and one-1100th of a second.

17. The stroboscopic animation system of claim 14 wherein the light source has a luminous intensity of between approximately 65 and 130 foot candles.

18. The stroboscopic animation system of claim 14 further comprising a manually rotatable top with an upper surface and a lower surface and means for retaining images to be animated on the upper surface of the top.

19. The stroboscopic animation system of claim 12 wherein the animation disk has portions to be completed by a user wherein the portions to be completed by the user comprise a plurality of stick figures disposed on the animation disk.

* * * * *